United States Patent [19]

Hutter et al.

[11] 4,342,496
[45] Aug. 3, 1982

[54] CONTACT ASSEMBLY INCORPORATING RETAINING MEANS

[75] Inventors: Harold G. Hutter, Brookfield; August B. Ramsland, New Fairfield, both of Conn.

[73] Assignee: Bunker Ramo Corporation, Oak Brook, Ill.

[21] Appl. No.: 152,218

[22] Filed: May 22, 1980

[51] Int. Cl.³ .................................. H01R 17/18
[52] U.S. Cl. ...................................... 339/177 E
[58] Field of Search .............. 339/177 R, 177 E, 90 C

[56] References Cited

U.S. PATENT DOCUMENTS

| | | | |
|---|---|---|---|
| 2,379,942 | 7/1945 | Webber | 173/328 |
| 3,076,169 | 1/1963 | Blaisdell | 339/89 |
| 3,406,373 | 10/1968 | Forney | 339/97 |
| 3,412,366 | 11/1968 | Pittman | 339/60 |
| 3,458,852 | 7/1969 | Higgins | 339/177 |
| 3,467,940 | 9/1969 | Wallo | 339/14 |
| 3,489,988 | 1/1970 | Carnaghan | 339/60 |
| 3,533,047 | 10/1970 | McFarlane | 339/94 |
| 3,550,064 | 12/1970 | Caller et al. | 339/65 |
| 3,596,231 | 7/1971 | Melton | 339/96 |
| 3,681,739 | 8/1972 | Kornick | 339/94 C |
| 3,706,958 | 12/1972 | Blanchenot | 339/177 E |
| 3,757,279 | 9/1973 | Winston | 339/177 R |
| 3,910,673 | 10/1975 | Stokes | 339/177 R |
| 3,970,355 | 7/1976 | Pitschi | 339/177 R |
| 3,977,752 | 8/1976 | Freitag | 339/177 R |
| 4,108,529 | 8/1978 | Evans | 339/177 R |
| 4,133,594 | 1/1979 | Laverick et al. | 339/95 D |
| 4,173,349 | 11/1979 | Neale | 277/6 |
| 4,180,301 | 12/1979 | Hutter | 339/90 C |

FOREIGN PATENT DOCUMENTS 690392 5/1967 Belgium.
885093 11/1971 Canada.
1229675 4/1971 United Kingdom.

Primary Examiner—Eugene F. Desmond
Attorney, Agent, or Firm—Nicholas A. Camasto; Frederick M. Arbuckle

[57] ABSTRACT

A connector for a cable having an inner element. The connector includes a support member having a cable-receiving opening at one end thereof. The support member has a passageway extending therethrough which communicates with the cable-receiving opening. The connector also includes a terminating member disposed within the passageway in the support member. The terminating member has an inner element-receiving opening at one end thereof which communicates with the cable-receiving opening. The connector further includes means for securing the inner element within the inner element-receiving opening in the terminating member. The securing means is adapted to freely admit the inner element into the inner element-receiving opening upon initial insertion of the cable into the cable-receiving opening in the support member. Additionally, the securing means is responsive to further insertion of the cable into the cable-receiving opening to secure the inner element within the inner element-receiving opening in the terminating member.

27 Claims, 18 Drawing Figures

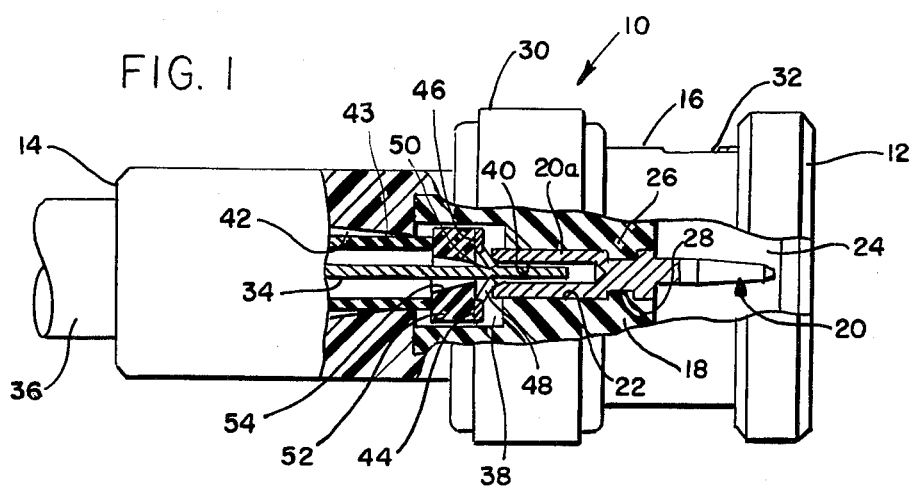
FIG. 1
FIG. 2
FIG. 3
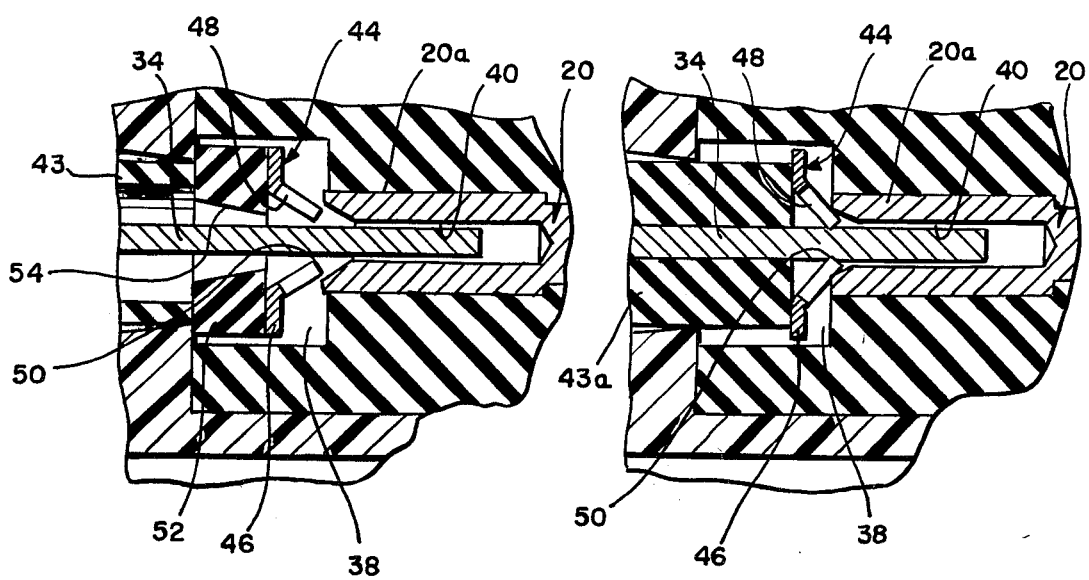

FIG. 4a
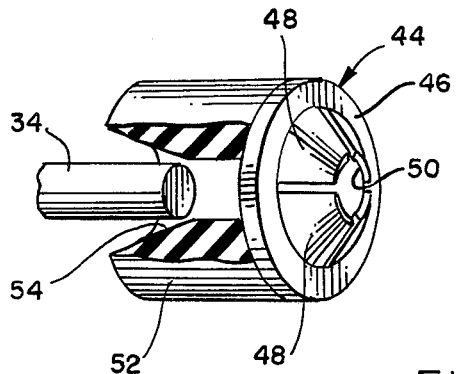
FIG. 4b
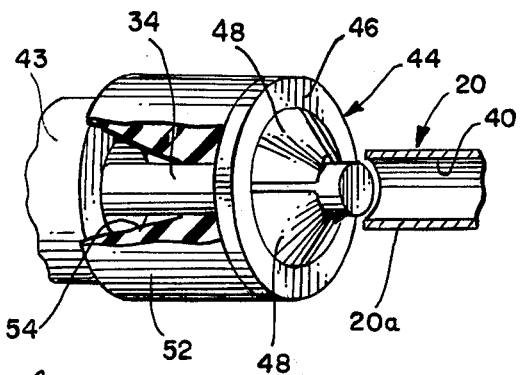
FIG. 4c
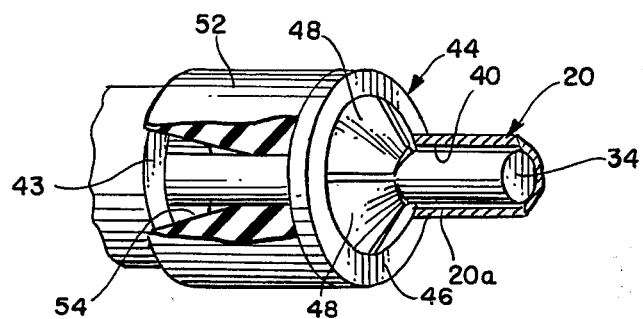
FIG. 5a  FIG. 5b  FIG. 5c  FIG. 5d
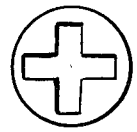  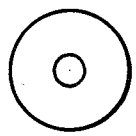 
FIG. 5e  FIG. 5f  FIG. 5g  FIG. 5h
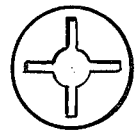 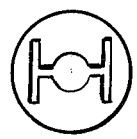 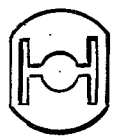 

CONTACT ASSEMBLY INCORPORATING RETAINING MEANS

BACKGROUND OF THE INVENTION

The present invention relates to a connector for a cable having an inner element, and more particularly, to a connector for a coaxial cable having an inner conductor and an outer conductor separated by a cable dielectric.

With respect to connectors generally, and in particular, connectors suitable for use with coaxial cables, the inner conductor of a coaxial cable is typically terminated in a contact by means of either soldering or crimping. Soldering is time consuming and requires special techniques and experienced personnel in order to prevent cold solder joints and heat transfer damage to the cable dielectric. Crimping eliminates time consuming soldering and the problems associated therewith although crimp tools are expensive, tend to be cumbersome to use, and most crimp tools will only crimp one cable size. Because of these shortcomings, soldering does not lend itself for use in the field and crimping requires installers to carry a number of cumbersome tools with them in the field.

Moreover, soldering and crimping are not fail-safe. It is quite possible, especially for untrained field personnel, to improperly terminate the inner conductor of a coaxial cable to a contact of the connector, thereby creating a faulty electrical connection. The connector field has, therefore, long needed a construction which can be used not only by experienced personnel in the field in a minimum of time without cumbersome tools or other special equipment but also by individual consumers who not only don't have the training for sophisticated assembly or termination procedures but also do not have the tools or special equipment required for soldering or crimping. It is highly desirable, particularly in view of the increasing interest of consumers in equipment utilizing coaxial connectors, to develop connectors which can be used without special tools or skill, while at the same time assuring satisfactory mechanical and electrical connections between a cable and the connector. While prior attempts have been made to provide connectors that eliminate the need for soldering or crimping (see, for example, U.S. Pat. No. 4,133,594), the development and refinement of this general approach has proceeded at a slow pace.

SUMMARY OF THE INVENTION

Accordingly, it is an object of the present invention to provide a connector that obviates the problems found in prior art connectors of the type described by providing an effective solderless, crimpless termination.

As will be appreciated, the present invention, in its broadest sense, is directed to a connector for a cable having an inner element. The connector includes a support member having a cable-receiving opening at one end thereof. The support member has a passageway extending therethrough which communicates with the cable-receiving opening. The connector also includes a terminating member disposed within the passageway in the support member. The terminating member has an inner element-receiving opening at one end thereof which communicates with the cable-receiving opening. The connector further includes means for securing the inner element within the inner element-receiving opening in the terminating member. In the preferred embodiment, the securing means is adapted to freely admit the inner element into the inner element-receiving opening upon initial insertion of the cable into the cable-receiving opening and is responsive to further insertion of the cable into the cable-receiving opening to secure the inner element within the inner element-receiving opening.

In one specific embodiment, a connector for a coaxial cable having an inner conductor and an outer conductor separated by a cable dielectric is disclosed. The connector includes an outer shell having a cable-receiving opening at one end thereof. A dielectric member is disposed within the outer shell and has a passageway extending therethrough. The passageway communicates with the cable-receiving opening in the outer shell. The connector also includes a contact disposed within the passageway in the dielectric member. The contact includes integral means for securing the inner conductor in electrically connected relationship. A plurality of tines comprise the securing means and converge in the direction of the cable-receiving opening to define an opening therebetween. In this embodiment, the opening defined by the tines is sufficient to freely receive the inner conductor upon initial insertion of the coaxial cable into the cable-receiving opening in the outer shell and the tines are responsive to further insertion of the coaxial cable into the cable-receiving opening to reduce the opening between the tines sufficient to grip the inner conductor in electrically connected relationship.

In another specific embodiment, the securing means includes a separate retaining member disposed within the connector between the cable-receiving opening and the contact. The retaining member includes a plurality of tines converging in the direction of the inner contact and defining an opening therebetween, in contrast to the integral tines of the contact which converge in the direction of the cable-receiving opening in the other embodiment previously described, but both embodiments are adapted to freely receive the inner conductor upon initial insertion of the cable into the cable-receiving opening in the outer shell. Moreover, the tines are responsive to further insertion of the cable into the cable-receiving opening to reduce the opening therebetween sufficient to grip the inner conductor and to engage the contact in electrically connected relationship in both embodiments.

In a broad sense, the present invention is directed to a connector for any cable having an inner element such as, electric power cable, electric signal cable, fiber optic cable, or the like. While a particularly advantageous application for coaxial cable is disclosed herein, those skilled in the art will readily appreciate the versatile nature of the improved connector for the present invention.

As will be appreciated, the connector of the present invention successfully provides a solderless, crimpless termination by utilizing a unique securing means capable of a wide range of use. Still other objects, advantages, and features of the connector of the present invention will be appreciated from a consideration of the details of construction set forth in the accompanying specification, claims, and drawings.

BRIEF DESCRIPTION OF THE DRAWINGS

The features of the present invention which are believed to be novel are set forth with particularity in the appended claims. The invention, together with the further objects and advantages thereof, may best be understood by reference to the following description taken in conjunction with the accompanying drawings. In the drawings, like reference numerals identify like elements in the several figures, in which:

FIG. 1 is an elevational view, partially in section, of a connector in accordance with the present invention being utilized with a coaxial cable having a hollow cable dielectric;

FIG. 2 is an enlarged detail view of a portion of FIG. 1 illustrating the securing means of a first embodiment of the connector of the present invention with a support insulator disposed between the cable dielectric and the securing means;

FIG. 3 is an enlarged detail view similar to FIG. 2 illustrating the securing means of the first embodiment of the connector of the present invention without a support insulator disposed between a solid cable dielectric and the securing means;

FIG. 4a is an enlarged perspective view, partially in section, of the securing means of FIG. 2 illustrating the initial relationship between a conductor, the support insulator, and the securing means as the conductor is inserted into an opening extending through the support insulator;

FIG. 4b is an enlarged perspective view, partially in section, of the securing means of FIG. 2 illustrating an intermediate relationship between the conductor, the support insulator, and the securing means after the conductor has been inserted into an opening extending through the securing means;

FIG. 4c is an enlarged perspective view, partially in section, of the securing means of FIG. 2 illustrating the final relationship between the conductor, the support insulator, and the securing means after the conductor has been inserted into an opening extending through a contact;

FIGS. 5a–5h are elevational views of variations of the securing means of FIG. 2;

DETAILED DESCRIPTION OF THE PREFERRED EMBODIMENT

Figure 6:
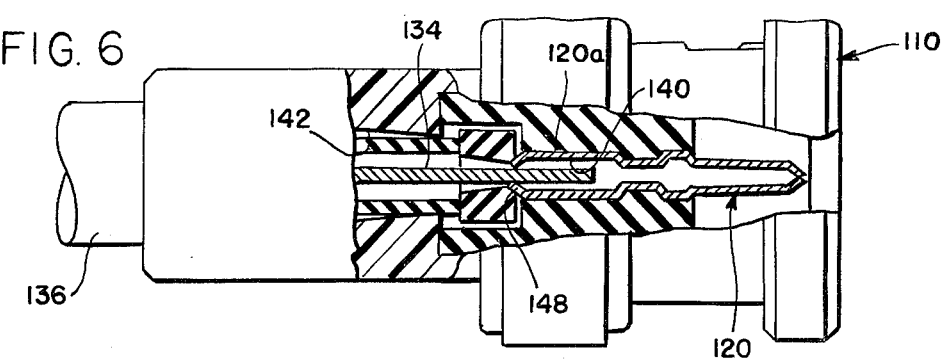
FIG. 6 is an elevational view, partially in section, of a second embodiment of connector in accordance with the present invention being utilized with a coaxial cable having a hollow cable dielectric.

Referring now to the drawings, the connectors shown therein are constructed in accordance with the principles of the present invention and are adapted to terminate, for example, a coaxial cable and mate with a second, complementary connector which, for the sake of clarity, has not been shown in the drawings.

In the particular embodiment illustrated in FIG. 1, the connector, identified generally by reference numeral 10, is conventionally designated as having a forward, mating end 12 for matingly engaging the second, complementary connector and a rearward, cable-receiving end 14.

Connector 10 includes a support member or rigid outer shell 16, a resilient dielectric insert or core 18 housed within the shell, and a terminating member or electrical contact 20 supported by the dielectric insert.

At the forward, mating end of the connector, shell 16 is tubular to accommodate the dielectric insert therein.

Dielectric insert 18 has an axial bore or passageway 22 communicating with a recess 24 at the forward end of the insert. Contact 20 is retained within bore 22 by means of an interference fit between a circumferential projection 26 of the resilient dielectric insert and an annular groove 20 on the outer surface of the contact. A portion of the contact extends forwardly into recess 24 and mates with a complementary contact of the second connector when connector 10 mates with the second connector.

A coupling ring 30 comprises a shell adjacent the forward mating end of the connector. The coupling ring is adapted to engage complementary coupling means on the second connector and secure connector 10 thereto. For example, the second connector may provide a bayonet pin which, when the connectors are assembled, engages a slot 32 in ring 30 as the ring is rotated.

In accordance with one aspect of the present invention, means are provided for securing an inner element or conductor 34 of a cable 36 to contact 20 without the use of crimping or soldering. To this end, the dielectric insert has a recess 38 at the rearward end of contact 20 includes a barrel portion 20a having a bore 40 opening to the recess.

An axial passageway 42 extends through the rearward cable-receiving end of the shell and is axially aligned with the common axis of recess 38 and contact bore 40. The passageway is tapered, narrowing at the juncture with the dielectric insert to a diameter approximately equal to the outside diameter of cable dielectric 43, but less than the diameter of recess 38. Thus, an annular chamber is formed in the dielectric insert within the shell. A retaining member or disk 44 comprising an outer annular portion 46 and a plurality of integral tines 48 converging forwardly in the direction of contact 20 is located in chamber 38, the ends of the tines being truncated to define an opening 50 through the disk which is slightly larger in diameter than the diameter dimension of the inner conductor 34 of cable 36. Located in the chamber behind disk 44 is a support insulator block 52 also having a tapered axial opening 54 therethrough. As thus assembled, tapered passageway 42, tapered opening 54 through the insulator block and opening 50 through the disk are all axially aligned with bore 40 of the contact barrel portion.

Referring to both FIGS. 2 and 3, chamber 38 serves an important function by confining disk 44 and insulator block 52 within the connector. Accordingly, the disk and the insulator block are not loose elements and they cannot become lost or otherwise displaced or mislocated within the connector structure prior to or during termination of an inner conductor within contact 20.

Referring specifically to FIG. 3, connector 10 is illustrated without an insulator block and with a solid core cable dielectric 43a. It will be appreciated that, in this form, cable dielectric 43a will engage retaining member or disk 44 directly so as to cause the tines thereof to move from a position freely receiving the inner conductor to a position gripping the inner conductor following initial receipt thereof within the contact bore. Accordingly, the insulator block is a desirable but optional feature.

Prior to terminating cable 36 in the connector, the outer jacket, the outer conductive braid, and the cable dielectric are stripped from a portion of the inner conductor adjacent the end of the cable. At a point rearwardly thereof, only the outer jacket and the outer conductive braid are stripped along a portion of the cable, leaving the dielectric intact on or about the inner conductor.

When the cable has been stripped to the appropriate dimensions, the end of cable 36 is inserted into passageway or cable-receiving opening 42 of the connector, as illustrated in FIGS. 4a and 4b taken with FIG. 2, and continued insertion of the cable results in the inner conductor freely passing into chamber 38, through the tapered opening of insulator block 52, through the opening in disk 44, and into the bore of contact barrel portion 20a. The tapered surfaces of cable-receiving opening 42, insulator block opening 54, tines 48, and the chamfered entrance surface leading into the bore in contact barrel portion 20a combine to guide the inner conductor into axial alignment with the contact bore and thus facilitate smooth and free insertion of the inner conductor into bore 40.

Further insertion of the cable into the connector, as illustrated in FIG. 4c taken with FIG. 1, causes inner conductor 34 to enter the contact bore and the forward end of cable dielectric 43 to pass through cable-receiving opening 42 and into chamber 38 where it butts against the insulator block. Continued pressure against block 52 by the cable dielectric during the final phase of insertion causes the block to force disk 44 forward. The forwardly converging tines, in turn, ride against the chamfered entrance surface leading into the bore in contact barrel portion 20a causing the tines to bite into the inner conductor and mechanically preventing withdrawal of the inner conductor while making a secure electrical connection between disk 44, contact 20 and inner conductor 34.

In the embodiment illustrated in FIG. 6, connector 110 includes securing means comprising a plurality of tines 148 integrally formed on a terminating member or contact 120. The tines 148 define an opening therebetween leading to and communicating with bore 140 in contact barrel portion 120a of the contact. However, the securing means has the same function as the retaining disk 44 of the embodiment illustrated in FIG. 1. The opening defined by tines 148 freely receives an inner conductor 134 upon initial insertion of a cable 136 into a cable-receiving opening 142. Additionally, the tines are responsive to further insertion of the cable into the cable-receiving opening to reduce the opening between the tines sufficient to grip the inner conductor.

Figure 7:
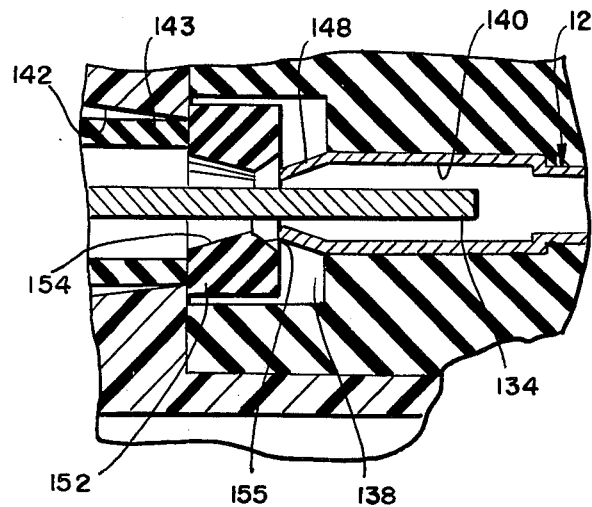
FIG. 7 is an enlarged detail view of a portion of FIG. 6 illustrating the securing means of the second embodiment of the connector of the present invention with a support insulator disposed between the cable dielectric and the securing means.

Referring to FIG. 7, tapered axial opening 154 in insulator block 152 is aligned with cable-receiving opening 142, the opening between tines 148, and inner conductor-receiving opening 140 in contact 120. Insulator block 152 preferably includes a second taper 155 leading into opening 154 on the side thereof facing contact 120 which coacts with converging tines 148 upon insertion of the coaxial cable into cable-receiving opening 142. Cable dielectric 143 engages the insulator block so as to cause taper 155 to coact with the converging tines whereby the tines grip inner conductor 134 in electrically connected relationship throughout approximately 360°.

Figure 9:
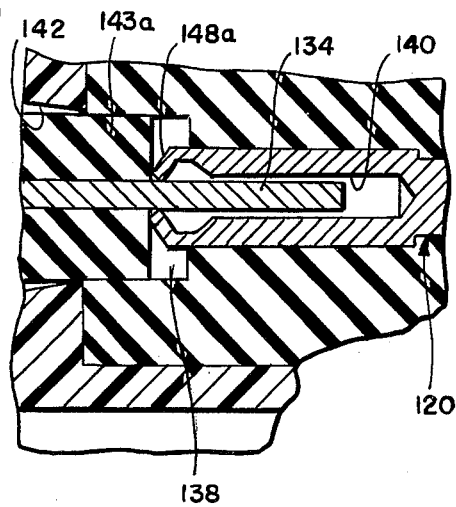
FIG. 9 is an enlarged detail view similar to FIG. 8 illustrating the securing means of the second embodiment of the connector of the present invention without a support insulator disposed between the solid cable dielectric and the securing means in which the final relationship between the conductor, the solid cable dielectric, and the securing means is shown after the conductor has been inserted into the opening extending through the contact.
Figure 8:
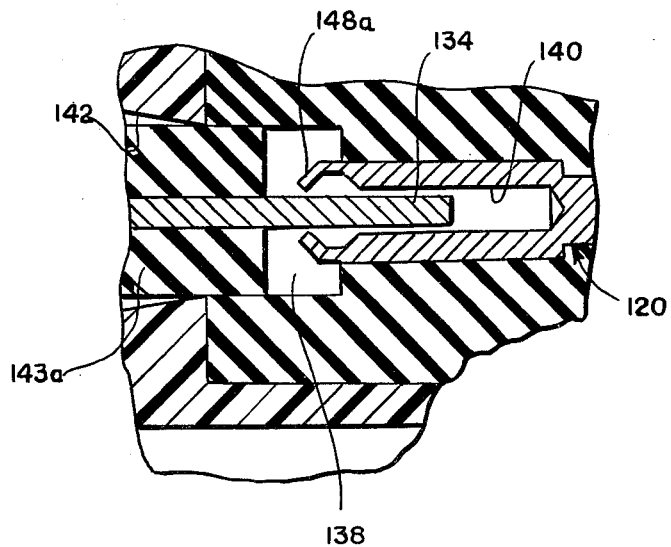
FIG. 8 is an enlarged detail view similar to FIG. 7 illustrating the securing means of the second embodiment of the connector of the present invention without a support insulator disposed between a solid cable dielectric and the securing means in which the initial relationship between a conductor, the solid cable dielectric, and the securing means is shown as the conductor is inserted into an opening extending through a contact.

Referring to FIGS. 8 and 9, the connector is illustrated in a form not using an insulator block but using a solid core dielectric 143a. It is useful for chamber 138 to be dimensioned the same or only slightly larger than cable dielectric 143a to provide a self-centering function for inner conductor 134 as it enters the opening between the tines in this form of the invention. It will be seen that cable dielectric 143a directly engages tines 148a which converge at a greater angle than tines 148 in FIG. 6 to provide better cooperation between the blunt end of the cable dielectric and the tines. As the cable is inserted into the connector, cable dielectric 143a causes tines 148a to move from a position freely receiving inner conductor 134 to a position gripping the inner conductor following initial receipt of inner conductor 134 in inner conductor-receiving opening 140 in contact 120.

FIG. 8 illustrates tines 148a freely receiving the inner conductor upon initial insertion of the coaxial cable into the cable-receiving opening in the connector. FIG. 9 shows tines 148a after responding to further insertion of the coaxial cable into the cable-receiving opening in the connector so as to grip the inner conductor in mechanically and electrically connected relationship.

All of the details of the embodiments illustrated in FIGS. 6-9 have not been fully described herein. It is believed that this is unnecessary and it has been avoided in order to eliminate unnecessary duplication in the description. However, the description of the various features of the embodiment of FIGS. 1-5 apply equally to the embodiment of FIGS. 6-9 to the extent that there is a correspondence therebetween.

With the connector of the present invention, no crimp tools or soldering are required resulting in lower assembly time and costs. The connector can be used for solid and stranded coaxial cable inner conductors and solid and hollow coaxial cable dielectric cores. It will also be apparent that the concept is independent of the method of attaching the coaxial cable outer conductor and jacket to the connector. The connector can utilize one standard size retaining disk for various cable types, one standard size retaining disk with various male and female center contacts, and it can be used with or without a support insulator block as well. It will also be appreciated that the contact and retaining disk are pre-assembled and are retained within the assembly to effectively provide for the user a one-piece connector. The connector does not retain the coaxial cable inner conductor until the cable is properly installed or seated therewithin. As will be appreciated, this is an important advantage for coaxial cables having a hollow or semi-solid dielectric core since the free entry of the inner conductor avoids the possibility that it might be pushed back into the cable dielectric.

Additional features of the connector of the present invention include 360° captivation of the conductor. The connector contains inherent self-centering elements for the conductor and can be designed to allow the connector to be reuseable by using spring tines or can be used to effect a permanent connection by using soft, metallic tines that will be permanently moved into a conductor-gripping position. Additionally, the connector can be adapted for use with any cable having an inner element including electric power cables, electric signal cables, fiber optic cables, and the like.

While the foregoing specification sets forth a detailed description of the preferred embodiments for purposes of illustration, the details herein given may be varied by those skilled in the art without departing from the spirit and scope of the appended claims.

What is claimed is:

1. A connector for a cable having an inner element, comprising:
    a support member having a cable-receiving opening at one end thereof for receiving said cable, without interruption, longitudinally into said cable-receiving opening, said support having therein a core including a passageway extending therethrough, said passageway communicating with said cable-receiving opening;
    a terminating member disposed within said passageway in said core, said terminating member having an inner element-receiving opening at one end thereof, said inner element-receiving opening communicating with said cable-receiving opening; and
    means for bitingly securing said inner element in electrically connected relationship within said inner element-receiving opening in said termination member, said securing means being adapted to freely admit said inner element into said inner element-receiving opening upon initial longitudinal insertion of said cable into said cable-receiving opening in said support member, said securing means being responsive solely to further longitudinal insertion of said cable alone into said cable-receiving opening to bitingly secure said inner element in electrical connected relationship within said inner element-receiving opening in said terminating member; and
    means for retaining said cable in position in said connector.

2. The connector as defined in claim 1 wherein said support member comprises a rigid shell and a resilient core disposed within said shell, said cable-receiving opening being formed in one end of said shell and said passageway extending through said core.

3. The connector as defined in claim 1 wherein said securing means includes a plurality of tines integrally formed on said terminating member, said tines defining an opening therebetween leading to and communicating with said inner element-receiving opening in said terminating member.

4. The connector as defined in claim 3 wherein said opening defined by said tines freely receives said inner element upon initial insertion of said cable into said cable-receiving opening, said tines being responsive to further insertion of said cable into said cable-receiving opening to reduce said opening between said tines sufficient to bite said inner element.

5. The connector as defined in claim 1 wherein said securing means includes a retaining member, said retaining member being disposed between said cable-receiving opening and said terminating member, said retaining member including a plurality of tines defining an opening therebetween.

6. The connector as defined in claim 5 wherein said opening defined by said tines freely receives said inner element upon initial insertion of said cable into said cable-receiving opening, said tines being responsive to further insertion of said cable into said cable-receiving opening to reduce said opening between said tines sufficient to bite said inner element.

7. A connector for a coaxial cable having an inner conductor and an outer conductor separated by a cable dielectric, comprising:
    an outer shell having a cable-receiving opening at one end thereof for receiving said cable, without interruption, longitudinally into said cable-receiving opening;
    a dielectric member disposed within said outer shell, said dielectric member having a passageway extending therethrough, said passageway communicating with said cable-receiving opening in said outer shell;
    a contact disposed within said passageway in said dielectric member; and
    means for bitingly securing said inner conductor to said contact in electrically connected relationship, said securing means being disposed internally of said outer shell and being adapted to freely receive said inner conductor upon initial longitudinal insertion of said cable into said cable-receiving opening, said securing means being responsive solely to further longitudinal insertion of said cable alone into said cable-receiving opening to bitingly secure said inner conductor to said contact in electrically connected relationship; and
    means for retaining said cable in position in said connector.

8. The connector as defined in claim 7 wherein said securing means includes a plurality of tines integrally formed on said contact, said tines defining an opening therebetween leading to and communicating with an inner conductor-receiving opening in said contact.

9. The connector as defined in claim 8 wherein said opening defined by said tines freely receives said inner conductor upon initial insertion of said coaxial cable into said cable-receiving opening, said tines being responsive to further insertion of said coaxial cable into said cable-receiving opening to reduce said opening between said tines sufficient to bite said inner conductor.

10. The connector as defined in claim 9 wherein said cable dielectric causes said tines to move from a position freely receiving said inner conductor to a position gripping said inner conductor following initial receipt of said inner conductor within said inner conductor-receiving opening in said contact.

11. The connector as defined in claim 7 wherein said securing means includes a retaining member, said retaining member being disposed between said cable-receiving opening and said contact, said retaining member including a plurality of tines defining an opening therebetween leading to and communicating with an inner conductor-receiving opening in said contact.

12. The connector as defined in claim 11 wherein said opening defined by said tines freely receives said inner conductor upon initial insertion of said coaxial cable into said cable-receiving opening, said tines being responsive to further insertion of said coaxial cable into said cable-receiving opening to reduce said opening between said tines sufficient to bite said inner conductor.

13. The connector as defined in claim 12 wherein said cable dielectric causes said tines to move from a position freely receiving said inner conductor to a position gripping said inner conductor following initial receipt of said inner conductor within said inner conductor-receiving opening in said contact.

14. A connector for a coaxial cable having an inner conductor and an outer conductor separated by a cable dielectric, comprising:
- an outer shell having a cable-receiving opening at one end thereof for receiving said cable, without interruption, longitudinally into said cable-receiving opening;
- a dielectric member disposed within said outer shell, said dielectric member having a passageway extending therethrough, said passageway communicating with said cable-receiving opening in said outer shell;
- a contact disposed within said passageway in said dielectric member;
- said contact including integral means for bitingly securing said inner conductor in electrically connected relationship, said securing means including a plurality of tines converging in the direction of said cable-receiving opening and defining an opening therebetween sufficient to freely receive said inner conductor upon initial longitudinal insertion of said coaxial cable into said cable receiving opening, said tines being responsive solely to further longitudinal insertion of said coaxial cable alone into said cable-receiving opening to reduce said opening between said tines sufficient to grip said inner conductor in a biting electrically connected relationship; and
- means for retaining said cable in position in said connector.

15. The connector as defined in claim 14 further including a support insulator disposed within a chamber intermediate said cable-receiving opening and said contact, said support insulator including an opening extending therethrough dimensioned larger than said inner conductor and smaller than said cable dielectric.

16. The connector as defined in claim 15 wherein said opening in said support insulator is aligned with said cable-receiving opening and said opening between said tines.

17. The connector as defined in claim 16 wherein said support insulator includes a taper leading into said opening therein on the side thereof facing said cable-receiving opening, said taper directing said inner conductor into said opening between said tines upon insertion of said coaxial cable into said cable-receiving opening.

18. The connector as defined in claim 16 wherein said support insulator includes a taper leading into said opening therein on the side thereof facing said contact, said taper coacting with said converging tines upon insertion of said coaxial cable into said cable-receiving opening, said cable dielectric engaging said support insulator so as to cause said taper to coact with said converging tines whereby said tines bite said inner conductor in electrically connected relationship.

19. The connector as defined in claim 14 wherein said tines bite said inner conductor throughout approximately 360°.

20. A connector for a coaxial cable having an inner conductor and an outer conductor separated by a cable dielectric, comprising:
- an outer shell having a cable-receiving opening at one end thereof for receiving said cable, without interruption, longitudinally into said cable-receiving opening;
- a dielectric member disposed within said outer shell, said dielectric member having a passageway extending therethrough, said passageway communicating with said cable-receiving opening in said outer shell;
- a contact disposed within said passageway in said dielectric member;
- means for bitingly securing said inner conductor to said contact in electrically connected relationship, said securing means including a retaining member disposed within said passageway in said dielectric member between said cable-receiving opening and said contact, said retaining member including a plurality of tines converging in the direction of said contact and defining an opening therebetween sufficient to freely receive said inner conductor upon initial longitudinal insertion of said cable into said cable-receiving opening, said tines being responsive solely to further longitudinal insertion of said cable alone into said cable-receiving opening to reduce said opening between said tines sufficient to grip said inner conductor and to bitingly engage said contact in electrically connected relationship; and
- means for retaining said cable in position in said connector.

21. The connector as defined in claim 20 wherein said cable dielectric engages said retaining member so as to cause said tines to move from a position freely receiving said inner conductor to a position biting said inner conductor following initial receipt of said inner conductor within an inner conductor-receiving opening in said contact.

22. The connector as defined in claim 20 further including a support insulator disposed within a chamber intermediate said cable-receiving opening and said retaining member, said support insulator including an opening extending therethrough dimensioned larger than said inner conductor and smaller than said cable dielectric.

23. The connector as defined in claim 22 wherein said opening in said support insulator is aligned with said cable-receiving opening and said opening between said tines.

24. The connector as defined in claim 23 wherein said support insulator includes a taper leading into said opening therein on the side thereof facing said cable-receiving opening, said taper directing said inner conductor into said opening between said tines upon insertion of said coaxial cable into said cable-receiving opening.

25. The connector as defined in claim 20 wherein said contact includes an inner conductor-receiving opening, said contact further including a taper leading into said inner conductor-receiving opening, said converging tines coacting with said taper of said contact to establish an electrically connected relationship therebetween.

26. The connector as defined in claim 23 wherein said tines bite said inner conductor throughout approximately 360°.

27. A connector for a coaxial cable having an inner conductor and an outer conductor separated by a cable dielectric comprising:
- an outer shell having a cable-receiving opening at one end thereof;
- a dielectric member disposed within said outer shell, said dielectric member having a passageway extending therethrough, said passageway communicating with said cable-receiving opening in said outer shell; and
- a contact disposed within said passageway in said dielectric member;
- said contact including integral means for bitingly securing said inner conductor in electrically connected relationship, said securing means including a plurality of tines converging in the direction of said cable-receiving opening and defining an opening therebetween sufficient to freely receive said inner conductor upon initial insertion of said coaxial cable into said cable-receiving opening, said cable dielectric being engageable with said tines so as to cause said tines to move from a position freely receiving said inner conductor to a position bitingly gripping said inner conductor following initial receipt of said inner conductor within said inner conductor-receiving opening in said contact; and
- means for retaining said cable in position in said connector.

* * * * *